United States Patent
Lomax et al.

(10) Patent No.: US 8,591,861 B2
(45) Date of Patent: *Nov. 26, 2013

(54) HYDROGENATING PRE-REFORMER IN SYNTHESIS GAS PRODUCTION PROCESSES

(75) Inventors: Franklin D. Lomax, Boyds, MD (US); Rama A. Zakaria, Gaithersburg, MD (US); Maxim Lyubovsky, Alexandria, VA (US); Stephen C. Leviness, Tulsa, OK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 818 days.

This patent is subject to a terminal disclaimer.

(21) Appl. No.: 12/061,355

(22) Filed: Apr. 2, 2008

(65) Prior Publication Data
US 2008/0262110 A1 Oct. 23, 2008

Related U.S. Application Data

(63) Continuation of application No. 12/029,826, filed on Feb. 12, 2008.

(60) Provisional application No. 60/912,495, filed on Apr. 18, 2007.

(51) Int. Cl.
*C01B 3/26* (2006.01)

(52) U.S. Cl.
USPC ........... 423/651; 423/650; 423/652; 423/653; 423/654

(58) Field of Classification Search
USPC ........................ 423/650, 651, 652, 653, 654
See application file for complete search history.

(56) References Cited

U.S. PATENT DOCUMENTS

| 2,520,925 A | 9/1950 | Garbo |
| 2,522,468 A | 9/1950 | Smith |

(Continued)

FOREIGN PATENT DOCUMENTS

| EP | 0 650 950 | 10/1994 |
| EP | 1 586 535 | 3/2005 |

(Continued)

OTHER PUBLICATIONS

Rostrup-Nielsen, "Catalytic Steam Reforming," Catalysis, Springer-Verlag: Berlin, eds. Anderson et al., 1984: pp. 1-30.

(Continued)

*Primary Examiner* — Paul Wartalowicz (57) ABSTRACT

A production process includes combining a first feed stream and a second feed stream to produce, in a pre-reforming reactor, a first product stream comprising $CH_4$ and $H_2O$; wherein the first feed stream contains a mixture of $H_2$ and at least one selected from the group consisting of hydrocarbons having two or more carbon atoms and alcohols having two or more carbon atoms, and the mixture has a hydrogen stoichiometric ratio ($\lambda$) of at least 0.1, and the second feed stream contains steam; feeding the first product stream into a reforming reactor; and reacting the first product stream in the reforming reactor to produce a second product stream containing CO and $H_2$; and a catalyst for use in the process. Conversion of the second product stream to synthetic crude, methanol, higher alcohols, and/or DME may also be undertaken. Yet further conversion of a synthetic crude to lubricants, diesel and the like, and/or the alcohols/DME to gasoline, olefins, and/or other oxygenates may also be included.

35 Claims, 3 Drawing Sheets

(56) References Cited

U.S. PATENT DOCUMENTS

| | | |
|---|---|---|
| 2,529,630 A | 11/1950 | Reichl |
| 2,541,657 A | 2/1951 | Lynch et al. |
| 2,543,791 A | 3/1951 | Malin |
| 2,622,089 A | 12/1952 | Mayland |
| 2,632,690 A | 3/1953 | Atwell |
| 2,635,952 A | 4/1953 | D'Ouville |
| 2,638,452 A | 5/1953 | Mayland et al. |
| 2,662,004 A | 12/1953 | Gaucher |
| 2,665,199 A | 1/1954 | Martin et al. |
| 2,676,156 A | 4/1954 | Bailey |
| 2,683,152 A | 7/1954 | Dickinson |
| 2,684,895 A | 7/1954 | Mayland |
| 2,957,902 A | 1/1956 | Rottig et al. |
| 2,741,649 A | 4/1956 | Abbott et al. |
| 2,752,382 A | 6/1956 | Garrett, Jr. et al. |
| 2,761,871 A | 9/1956 | Lueben |
| 2,765,222 A | 10/1956 | Martin et al. |
| 2,771,481 A | 11/1956 | Rottig |
| 2,772,149 A | 11/1956 | Garbo |
| 2,793,241 A | 5/1957 | Fawcett et al. |
| 2,805,239 A | 9/1957 | Rottig |
| 2,818,418 A | 12/1957 | Rottig et al. |
| 2,847,358 A | 8/1958 | Kemp et al. |
| 2,942,958 A | 6/1960 | Dwyer |
| 3,001,857 A | 9/1961 | Pollock |
| 3,044,949 A | 7/1962 | Schlenk |
| 3,193,490 A | 7/1965 | Broughton |
| 3,224,956 A | 12/1965 | Phillips et al. |
| 3,239,455 A | 3/1966 | Lickus et al. |
| 3,250,601 A | 5/1966 | Jenny |
| 3,255,101 A | 6/1966 | Arey, Jr. et al. |
| 3,268,436 A | 8/1966 | Arey, Jr. et al. |
| 3,329,602 A | 7/1967 | Moyer |
| 3,429,678 A | 2/1969 | Milbourne et al. |
| 3,573,224 A | 3/1971 | Strelzoff et al. |
| 3,939,191 A | 2/1976 | Asano et al. |
| 3,940,428 A | 2/1976 | Connell et al. |
| 3,950,369 A | 4/1976 | Gent |
| 3,972,958 A | 8/1976 | Garwood et al. |
| 3,998,898 A | 12/1976 | Chang et al. |
| 4,025,575 A | 5/1977 | Chang et al. |
| 4,025,576 A | 5/1977 | Chang et al. |
| 4,035,430 A | 7/1977 | Dwyer et al. |
| 4,041,095 A | 8/1977 | Kuo |
| 4,041,096 A | 8/1977 | Kuo |
| 4,042,614 A | 8/1977 | Vannice et al. |
| 4,044,064 A | 8/1977 | Milstein et al. |
| 4,048,250 A * | 9/1977 | Garwood et al. ............. 518/704 |
| 4,052,479 A | 10/1977 | Chang et al. |
| 4,058,576 A | 11/1977 | Chang et al. |
| 4,059,648 A | 11/1977 | Derr et al. |
| 4,071,574 A | 1/1978 | Milstein et al. |
| 4,086,262 A | 4/1978 | Chang et al. |
| 4,088,671 A | 5/1978 | Kobylinski |
| 4,126,644 A | 11/1978 | Caesar et al. |
| 4,157,338 A | 6/1979 | Haag et al. |
| 4,234,412 A | 11/1980 | Boersma et al. |
| 4,238,403 A | 12/1980 | Pinto |
| 4,337,336 A | 6/1982 | Umezawa et al. |
| 4,385,193 A | 5/1983 | Bijwaard et al. |
| 4,393,265 A | 7/1983 | Bonifaz |
| 4,399,234 A | 8/1983 | Beuther et al. |
| 4,404,414 A | 9/1983 | Penick et al. |
| 4,410,751 A | 10/1983 | Shin et al. |
| 4,417,000 A | 11/1983 | Slaugh et al. |
| 4,418,155 A | 11/1983 | Chang et al. |
| 4,423,265 A | 12/1983 | Chu et al. |
| 4,444,909 A | 4/1984 | Chang et al. |
| 4,449,961 A | 5/1984 | Forbus et al. |
| 4,455,394 A | 6/1984 | Pinto |
| 4,460,378 A | 7/1984 | Di Pietro et al. |
| 4,476,250 A | 10/1984 | Joyner et al. |
| 4,476,338 A | 10/1984 | Chang et al. |
| 4,477,594 A | 10/1984 | Greene et al. |
| 4,481,012 A | 11/1984 | Di Pietro et al. |
| 4,481,305 A | 11/1984 | Jorn et al. |
| 4,492,774 A | 1/1985 | Kibby et al. |
| 4,496,786 A | 1/1985 | Santilli et al. |
| 4,500,417 A | 2/1985 | Chen et al. |
| 4,507,403 A | 3/1985 | Asakawa |
| 4,513,156 A | 4/1985 | Tabak |
| 4,513,160 A | 4/1985 | Avidan et al. |
| 4,520,215 A | 5/1985 | Owen et al. |
| 4,520,216 A | 5/1985 | Skov et al. |
| 4,521,248 A | 6/1985 | Yamamoto et al. |
| 4,521,540 A | 6/1985 | Pierantozzi |
| 4,523,047 A | 6/1985 | Chester et al. |
| 4,537,909 A | 8/1985 | Lin et al. |
| 4,540,713 A | 9/1985 | Hardman et al. |
| 4,550,217 A | 10/1985 | Graziani et al. |
| 4,560,807 A | 12/1985 | Murai et al. |
| 4,579,999 A | 4/1986 | Gould et al. |
| 4,585,798 A | 4/1986 | Beuther et al. |
| 4,590,320 A | 5/1986 | Sapre |
| 4,594,172 A | 6/1986 | Sie |
| 4,599,481 A | 7/1986 | Post et al. |
| 4,605,676 A | 8/1986 | Kobylinski et al. |
| 4,605,679 A | 8/1986 | Kobylinski et al. |
| 4,605,680 A | 8/1986 | Beuther et al. |
| 4,609,678 A | 9/1986 | Hardman et al. |
| 4,613,624 A | 9/1986 | Beuther et al. |
| 4,628,066 A | 12/1986 | Bonnell et al. |
| 4,628,135 A | 12/1986 | Owen et al. |
| 4,631,182 A | 12/1986 | Tottrup et al. |
| 4,640,766 A | 2/1987 | Post et al. |
| 4,652,587 A | 3/1987 | Dyer et al. |
| 4,666,944 A | 5/1987 | Mazanec et al. |
| 4,681,701 A | 7/1987 | Sie |
| 4,684,757 A | 8/1987 | Avidan et al. |
| 4,686,238 A | 8/1987 | Bode et al. |
| 4,686,313 A | 8/1987 | Bell et al. |
| 4,689,205 A | 8/1987 | Gould et al. |
| 4,725,626 A | 2/1988 | Graham et al. |
| 4,755,498 A * | 7/1988 | Setzer et al. ................. 502/303 |
| 4,766,154 A | 8/1988 | Bonnell et al. |
| 4,766,155 A | 8/1988 | Sun et al. |
| 4,767,569 A | 8/1988 | Brophy et al. |
| 4,780,481 A | 10/1988 | Courty et al. |
| 4,788,042 A | 11/1988 | Marsh et al. |
| 4,788,222 A | 11/1988 | Rice et al. |
| 4,788,365 A | 11/1988 | Harandi et al. |
| 4,788,369 A | 11/1988 | Marsh et al. |
| 4,788,377 A | 11/1988 | Chang et al. |
| 4,791,141 A | 12/1988 | Chaumette et al. |
| 4,812,433 A | 3/1989 | Sie et al. |
| 4,814,535 A | 3/1989 | Yurchak |
| 4,814,536 A | 3/1989 | Yurchak |
| 4,831,195 A | 5/1989 | Harandi et al. |
| 4,836,831 A | 6/1989 | Martens |
| 4,849,575 A | 7/1989 | Lewis |
| 4,857,667 A | 8/1989 | Harandi et al. |
| 4,861,351 A | 8/1989 | Nicholas et al. |
| 4,868,221 A | 9/1989 | Sie et al. |
| 4,873,267 A | 10/1989 | Sie et al. |
| 4,873,390 A | 10/1989 | Lewis et al. |
| 4,876,286 A | 10/1989 | Sie et al. |
| 4,886,651 A | 12/1989 | Patel et al. |
| 4,898,717 A | 2/1990 | Hsia et al. |
| 4,899,002 A | 2/1990 | Harandi et al. |
| 4,906,671 A | 3/1990 | Haag et al. |
| 4,910,227 A | 3/1990 | Brown et al. |
| 4,919,786 A | 4/1990 | Hamner et al. |
| 4,929,780 A | 5/1990 | Wright et al. |
| 4,935,568 A | 6/1990 | Harandi et al. |
| 4,943,672 A | 7/1990 | Hamner et al. |
| 4,959,338 A | 9/1990 | Miura et al. |
| 4,975,177 A | 12/1990 | Garwood et al. |
| 4,978,689 A | 12/1990 | Bell et al. |
| 4,981,491 A | 1/1991 | Harandi et al. |
| 4,985,203 A | 1/1991 | Tabak |
| 4,985,230 A | 1/1991 | Baden et al. |
| 4,995,962 A | 2/1991 | Degnan, Jr. et al. |
| 5,028,400 A | 7/1991 | Harandi et al. |
| 5,037,856 A | 8/1991 | Post et al. |

(56) References Cited

U.S. PATENT DOCUMENTS

| | | |
|---|---|---|
| 5,041,690 A | 8/1991 | Harandi et al. |
| 5,045,287 A | 9/1991 | Harandi et al. |
| 5,047,070 A | 9/1991 | Harandi et al. |
| 5,063,250 A | 11/1991 | Murayama et al. |
| 5,068,057 A | 11/1991 | Gustafson et al. |
| 5,095,159 A | 3/1992 | Harandi et al. |
| 5,095,163 A | 3/1992 | Barger |
| 5,096,688 A | 3/1992 | Miller et al. |
| 5,116,879 A | 5/1992 | Eri et al. |
| 5,130,101 A | 7/1992 | Harandi et al. |
| 5,135,638 A | 8/1992 | Miller |
| 5,135,958 A | 8/1992 | Radlowski et al. |
| 5,149,464 A | 9/1992 | Green et al. |
| 5,167,937 A | 12/1992 | Harandi et al. |
| 5,169,869 A | 12/1992 | Miller et al. |
| 5,177,279 A | 1/1993 | Harandi |
| 5,179,129 A | 1/1993 | Studer |
| 5,191,141 A | 3/1993 | Barger et al. |
| 5,191,142 A | 3/1993 | Marshall et al. |
| 5,216,034 A | 6/1993 | Sie |
| 5,218,003 A | 6/1993 | Lewnard et al. |
| 5,219,891 A | 6/1993 | Sie |
| 5,227,407 A | 7/1993 | Kim |
| 5,233,117 A | 8/1993 | Barger |
| 5,238,898 A | 8/1993 | Han et al. |
| 5,246,566 A | 9/1993 | Miller |
| 5,252,609 A | 10/1993 | Pinto |
| 5,262,443 A | 11/1993 | Topsoe et al. |
| 5,284,878 A | 2/1994 | Studer et al. |
| 5,287,570 A | 2/1994 | Peterson et al. |
| 5,310,506 A | 5/1994 | Supp et al. |
| 5,316,627 A | 5/1994 | Hammer |
| 5,348,982 A | 9/1994 | Herbolzheimer et al. |
| 5,362,378 A | 11/1994 | Borghard et al. |
| 5,367,100 A | 11/1994 | Gongwei et al. |
| 5,378,348 A | 1/1995 | Davis et al. |
| 5,422,375 A | 6/1995 | Rytter et al. |
| 5,424,335 A | 6/1995 | Abbott |
| 5,431,855 A | 7/1995 | Green et al. |
| 5,486,218 A | 1/1996 | Carlson et al. |
| 5,491,273 A | 2/1996 | Santiesteban et al. |
| 5,500,149 A | 3/1996 | Green et al. |
| 5,508,246 A | 4/1996 | Apesteguia et al. |
| 5,512,599 A | 4/1996 | Hiramatsu et al. |
| 5,530,168 A | 6/1996 | Underwood et al. |
| 5,545,791 A | 8/1996 | Sakuma et al. |
| 5,554,351 A | 9/1996 | Primdahl |
| 5,573,990 A | 11/1996 | Wang et al. |
| 5,591,238 A | 1/1997 | Bhattacharyya et al. |
| 5,602,289 A | 2/1997 | van Dijk |
| 5,627,295 A | 5/1997 | Sofianos et al. |
| 5,637,259 A | 6/1997 | Galuszka et al. |
| 5,648,582 A | 7/1997 | Schmidt et al. |
| 5,653,774 A | 8/1997 | Bhattacharyya et al. |
| 5,653,916 A | 8/1997 | Disselhorst et al. |
| 5,654,491 A | 8/1997 | Goetsch et al. |
| 5,658,497 A | 8/1997 | Kumar et al. |
| 5,714,132 A | 2/1998 | Kapoor et al. |
| 5,714,662 A | 2/1998 | Vora et al. |
| 5,720,901 A | 2/1998 | De Jong et al. |
| 5,723,401 A | 3/1998 | Sakuma et al. |
| 5,733,941 A | 3/1998 | Waycuilis |
| 5,744,680 A | 4/1998 | Mulvaney, III et al. |
| 5,750,799 A | 5/1998 | van Dijk |
| 5,750,819 A | 5/1998 | Wittenbrink et al. |
| 5,753,143 A | 5/1998 | Bhat et al. |
| 5,753,716 A | 5/1998 | Peng et al. |
| 5,756,419 A | 5/1998 | Chaumette et al. |
| 5,766,274 A | 6/1998 | Wittenbrink et al. |
| 5,767,039 A | 6/1998 | Yamagishi et al. |
| 5,770,629 A | 6/1998 | Degeorge et al. |
| 5,776,988 A | 7/1998 | Chaumette et al. |
| 5,783,607 A | 7/1998 | Chaumette et al. |
| 5,817,701 A | 10/1998 | Leviness et al. |
| 5,844,005 A | 12/1998 | Bauman et al. |
| 5,855,815 A | 1/1999 | Park et al. |
| 5,861,441 A | 1/1999 | Waycuilis |
| 5,869,541 A | 2/1999 | Euzen et al. |
| 5,882,505 A | 3/1999 | Wittenbrink et al. |
| 5,883,138 A | 3/1999 | Hershkowitz et al. |
| 5,888,376 A | 3/1999 | Wittenbrink et al. |
| 5,905,094 A | 5/1999 | Chang et al. |
| 5,908,963 A | 6/1999 | Voss et al. |
| 5,931,978 A | 8/1999 | Oortwijn et al. |
| 5,935,489 A | 8/1999 | Hershkowitz et al. |
| 5,952,538 A | 9/1999 | Vaughn et al. |
| 5,958,364 A | 9/1999 | Dunne et al. |
| 5,958,986 A | 9/1999 | Mart et al. |
| 5,976,351 A | 11/1999 | Apelian et al. |
| 5,980,596 A | 11/1999 | Hershkowitz et al. |
| 5,980,782 A | 11/1999 | Hershkowitz et al. |
| 5,980,840 A | 11/1999 | Kleefisch et al. |
| 5,981,608 A | 11/1999 | Geerlings et al. |
| 5,989,457 A | 11/1999 | Seshan et al. |
| 5,990,369 A | 11/1999 | Barger et al. |
| 5,993,644 A | 11/1999 | Xiao et al. |
| 5,993,761 A | 11/1999 | Czernichowski et al. |
| 6,007,742 A | 12/1999 | Czernichowski et al. |
| 6,025,305 A | 2/2000 | Aldrich et al. |
| 6,043,288 A | 3/2000 | DeGeorge et al. |
| 6,045,688 A | 4/2000 | Ruottu et al. |
| 6,048,472 A | 4/2000 | Nataraj et al. |
| 6,049,017 A | 4/2000 | Vora et al. |
| 6,060,524 A | 5/2000 | Casanave et al. |
| 6,066,307 A | 5/2000 | Keskar et al. |
| 6,069,180 A | 5/2000 | Peng et al. |
| 6,075,061 A | 6/2000 | Wittenbrink et al. |
| 6,077,323 A | 6/2000 | Nataraj et al. |
| 6,085,512 A | 7/2000 | Agee et al. |
| 6,096,940 A | 8/2000 | Wittenbrink et al. |
| 6,103,773 A | 8/2000 | Wittenbrink et al. |
| 6,114,400 A | 9/2000 | Nataraj et al. |
| 6,121,333 A | 9/2000 | Clerici et al. |
| 6,121,503 A | 9/2000 | Janssen et al. |
| 6,130,259 A | 10/2000 | Waycuilis |
| 6,143,202 A | 11/2000 | Christensen et al. |
| 6,143,203 A | 11/2000 | Zeng et al. |
| 6,147,126 A | 11/2000 | DeGeorge et al. |
| 6,153,163 A | 11/2000 | Prasad et al. |
| 6,155,039 A | 12/2000 | Agee et al. |
| 6,162,956 A | 12/2000 | Berlowitz et al. |
| 6,166,282 A | 12/2000 | Miller |
| 6,169,120 B1 | 1/2001 | Beer |
| 6,172,124 B1 | 1/2001 | Wolflick et al. |
| 6,174,460 B1 | 1/2001 | Grunvald et al. |
| 6,179,994 B1 | 1/2001 | Clark et al. |
| 6,180,684 B1 | 1/2001 | Halmo et al. |
| 6,180,842 B1 | 1/2001 | Berlowitz et al. |
| 6,190,532 B1 | 2/2001 | Degnan et al. |
| 6,191,175 B1 | 2/2001 | Haugaard et al. |
| 6,211,255 B1 | 4/2001 | Schanke et al. |
| 6,213,660 B1 | 4/2001 | Waller et al. |
| 6,214,055 B1 | 4/2001 | Simionescu et al. |
| 6,214,066 B1 | 4/2001 | Nataraj et al. |
| 6,214,890 B1 | 4/2001 | Roy et al. |
| 6,218,439 B1 | 4/2001 | Kobayashi et al. |
| 6,224,789 B1 | 5/2001 | Dybkjaer |
| 6,225,359 B1 * | 5/2001 | O'Rear et al. ................ 518/706 |
| 6,235,798 B1 | 5/2001 | Roy et al. |
| 6,239,184 B1 | 5/2001 | Beer et al. |
| 6,254,807 B1 | 7/2001 | Schmidt et al. |
| 6,255,357 B1 | 7/2001 | Abbott |
| 6,262,131 B1 | 7/2001 | Arcuri et al. |
| 6,277,894 B1 | 8/2001 | Agee et al. |
| 6,284,807 B1 | 9/2001 | Leviness et al. |
| 6,296,686 B1 * | 10/2001 | Prasad et al. ...................... 95/51 |
| 6,296,757 B1 | 10/2001 | Wittenbrink et al. |
| 6,300,380 B1 | 10/2001 | Kobayashi et al. |
| 6,303,839 B1 | 10/2001 | Marker |
| 6,309,432 B1 | 10/2001 | Wittenbrink et al. |
| 6,312,658 B1 | 11/2001 | Hufton et al. |
| 6,312,660 B1 | 11/2001 | Yagi et al. |
| 6,319,872 B1 | 11/2001 | Manzer et al. |
| 6,332,974 B1 | 12/2001 | Wittenbrink et al. |

(56) References Cited

U.S. PATENT DOCUMENTS

| | | | |
|---|---|---|---|
| 6,338,833 B1 | 1/2002 | Aasberg-Petersen |
| 6,340,437 B1 | 1/2002 | Yagi et al. |
| 6,344,491 B1 | 2/2002 | Beer et al. |
| 6,353,035 B2 | 3/2002 | Manzer et al. |
| 6,355,219 B2 | 3/2002 | Suh et al. |
| 6,372,949 B1 | 4/2002 | Brown et al. |
| 6,375,830 B1 | 4/2002 | Clark et al. |
| 6,375,916 B2 | 4/2002 | Christensen et al. |
| 6,376,423 B2 | 4/2002 | Yagi et al. |
| 6,383,366 B1 | 5/2002 | Riley et al. |
| 6,387,843 B1 | 5/2002 | Yagi et al. |
| 6,387,963 B1 | 5/2002 | Fitzpatrick |
| 6,388,833 B1 | 5/2002 | Golowka et al. |
| 6,399,844 B1 | 6/2002 | van Dijk |
| 6,402,988 B1 | 6/2002 | Gottzmann et al. |
| 6,402,989 B1 | 6/2002 | Gaffney |
| 6,403,660 B1 | 6/2002 | Espinoza et al. |
| 6,409,940 B1 | 6/2002 | Gaffney et al. |
| 6,420,618 B1 | 7/2002 | Berlowitz et al. |
| 6,433,029 B1 | 8/2002 | Fitzpatrick |
| 6,444,712 B1 * | 9/2002 | Janda ............... 518/706 |
| 6,444,869 B2 | 9/2002 | Senetar et al. |
| 6,451,864 B1 | 9/2002 | Wang et al. |
| 6,455,597 B2 | 9/2002 | Hohn et al. |
| 6,458,265 B1 | 10/2002 | Miller et al. |
| 6,458,334 B1 | 10/2002 | Tanhankar et al. |
| 6,461,539 B1 | 10/2002 | Gaffney |
| 6,465,530 B2 | 10/2002 | Roy-Auberger et al. |
| 6,475,375 B1 * | 11/2002 | Dancuart ............... 208/78 |
| 6,475,409 B2 | 11/2002 | Iijima et al. |
| 6,475,960 B1 | 11/2002 | Betlowitz et al. |
| 6,479,557 B1 | 11/2002 | Lange et al. |
| 6,486,218 B2 | 11/2002 | Kobayashi et al. |
| 6,486,219 B1 | 11/2002 | Janda et al. |
| 6,488,907 B1 | 12/2002 | Barnes et al. |
| 6,489,370 B2 | 12/2002 | Iijima et al. |
| 6,491,880 B1 | 12/2002 | Wang et al. |
| 6,492,290 B1 | 12/2002 | Dyer et al. |
| 6,512,018 B2 | 1/2003 | Kennedy |
| 6,515,032 B2 | 2/2003 | Moore, Jr. et al. |
| 6,515,034 B2 | 2/2003 | Moore, Jr. et al. |
| 6,525,104 B2 | 2/2003 | Abbott |
| 6,527,980 B1 | 3/2003 | Roden et al. |
| 6,534,551 B2 | 3/2003 | Allam et al. |
| 6,534,692 B1 | 3/2003 | Barger et al. |
| 6,544,407 B1 | 4/2003 | Calemma et al. |
| 6,558,634 B1 | 5/2003 | Wang et al. |
| 6,583,186 B2 | 6/2003 | Moore, Jr. |
| 6,602,840 B1 | 8/2003 | Scheibel et al. |
| 6,605,206 B1 | 8/2003 | Johnson et al. |
| 6,607,568 B2 | 8/2003 | Wittenbrink et al. |
| 6,607,678 B2 | 8/2003 | Wang et al. |
| 6,608,114 B1 | 8/2003 | Heydorn et al. |
| 6,609,562 B2 | 8/2003 | Font-Freide et al. |
| 6,613,951 B1 | 9/2003 | Brown et al. |
| 6,632,971 B2 | 10/2003 | Brown et al. |
| 6,635,191 B2 | 10/2003 | Figueroa et al. |
| 6,635,681 B2 | 10/2003 | Moore, Jr. et al. |
| 6,638,889 B2 | 10/2003 | van Berge et al. |
| 6,663,768 B1 | 12/2003 | Miller |
| 6,669,743 B2 | 12/2003 | Wittenbrink et al. |
| 6,669,744 B2 | 12/2003 | Allam et al. |
| 6,673,270 B1 | 1/2004 | De Jong et al. |
| 6,680,006 B2 | 1/2004 | Chantal |
| 6,686,511 B2 | 2/2004 | Miller et al. |
| 6,693,060 B2 | 2/2004 | Park et al. |
| 6,693,138 B2 | 2/2004 | O'Rear |
| 6,695,983 B2 | 2/2004 | Prasad et al. |
| 6,696,501 B2 | 2/2004 | Schanke et al. |
| 6,700,027 B1 | 3/2004 | Johnson et al. |
| 6,702,937 B2 | 3/2004 | Johnson et al. |
| 6,702,960 B1 | 3/2004 | Schaddenhorst et al. |
| 6,703,535 B2 | 3/2004 | Johnson et al. |
| 6,710,218 B1 | 3/2004 | Pop et al. |
| 6,716,887 B2 | 4/2004 | Newton et al. |
| 6,723,889 B2 | 4/2004 | Miller et al. |
| 6,727,399 B1 | 4/2004 | Black et al. |
| 6,730,285 B2 | 5/2004 | Aasberg-Petersen et al. |
| 6,730,708 B2 | 5/2004 | Raje et al. |
| 6,740,783 B1 | 5/2004 | Jun et al. |
| 6,743,962 B2 | 6/2004 | O'Rear et al. |
| 6,749,828 B1 | 6/2004 | Fukunaga |
| 6,750,258 B2 | 6/2004 | Wang et al. |
| 6,755,961 B1 | 6/2004 | Berlowitz et al. |
| 6,761,838 B2 | 7/2004 | Zeng et al. |
| 6,768,034 B2 | 7/2004 | Fung et al. |
| 6,768,037 B2 | 7/2004 | O'Rear et al. |
| 6,784,212 B2 | 8/2004 | Steynberg et al. |
| 6,784,329 B2 | 8/2004 | O'Rear et al. |
| 6,787,022 B1 | 9/2004 | Berlowitz et al. |
| 6,793,700 B2 | 9/2004 | Pham et al. |
| 6,797,154 B2 | 9/2004 | Mukherjee et al. |
| 6,797,243 B2 | 9/2004 | Arcuri et al. |
| 6,800,665 B1 | 10/2004 | Shikada et al. |
| 6,809,122 B2 | 10/2004 | Zhang et al. |
| 6,822,131 B1 | 11/2004 | Berlowitz et al. |
| 6,824,574 B2 | 11/2004 | O'Rear et al. |
| 6,833,064 B2 | 12/2004 | Berlowitz et al. |
| 6,841,711 B2 | 1/2005 | Krug et al. |
| 6,852,897 B2 | 2/2005 | Inomata et al. |
| 6,864,293 B2 | 3/2005 | Steynberg |
| 6,872,753 B2 | 3/2005 | Landis et al. |
| 6,875,794 B2 | 4/2005 | Seiki et al. |
| 6,881,394 B2 | 4/2005 | Keller |
| 6,881,759 B2 | 4/2005 | Nielsen et al. |
| 6,894,080 B2 | 5/2005 | Seiki et al. |
| 6,900,366 B2 | 5/2005 | Rosenbaum et al. |
| 6,939,999 B2 | 9/2005 | Abazajian et al. |
| 6,942,839 B2 | 9/2005 | Huisman et al. |
| 6,946,493 B2 | 9/2005 | Mohedas et al. |
| 6,953,488 B2 | 10/2005 | Bhattacharyya et al. |
| 6,958,310 B2 | 10/2005 | Wang et al. |
| 6,958,363 B2 | 10/2005 | Espinoza et al. |
| 6,962,651 B2 | 11/2005 | Miller et al. |
| 6,964,398 B1 | 11/2005 | Faulkner |
| 6,969,505 B2 | 11/2005 | Tonkovich et al. |
| 6,977,237 B2 | 12/2005 | Geerlings et al. |
| 6,982,287 B2 | 1/2006 | Wang et al. |
| 6,984,371 B2 | 1/2006 | Zhao et al. |
| 7,001,927 B2 | 2/2006 | Zhang et al. |
| 7,011,760 B2 | 3/2006 | Wang et al. |
| 7,014,835 B2 | 3/2006 | Mathias et al. |
| 7,015,255 B1 | 3/2006 | Tomura et al. |
| 7,018,525 B2 | 3/2006 | Miller et al. |
| 7,033,552 B2 | 4/2006 | O'Rear et al. |
| 7,033,569 B2 | 4/2006 | Stickney et al. |
| 7,033,972 B2 | 4/2006 | Shikada et al. |
| 7,037,485 B1 * | 5/2006 | Drnevich et al. ............. 423/652 |
| 7,037,947 B2 | 5/2006 | Font Freide et al. |
| 7,045,486 B2 | 5/2006 | Wang et al. |
| 7,045,554 B2 | 5/2006 | Raje et al. |
| 7,053,254 B2 | 5/2006 | Miller |
| 7,056,488 B2 | 6/2006 | Niu et al. |
| 7,067,558 B2 | 6/2006 | Grobys et al. |
| 7,067,559 B2 | 6/2006 | Bhatt et al. |
| 7,067,560 B2 | 6/2006 | Bowe |
| 7,067,561 B2 | 6/2006 | Bowe |
| 7,074,320 B2 | 7/2006 | Miller |
| 7,074,347 B2 | 7/2006 | Erikstrup et al. |
| 7,078,578 B2 | 7/2006 | Janssens et al. |
| 7,084,180 B2 | 8/2006 | Wang et al. |
| 7,087,192 B2 | 8/2006 | Rostrup-Nielsen et al. |
| 7,087,651 B2 | 8/2006 | Lee-Tuffnell et al. |
| 7,090,826 B2 | 8/2006 | Jiang et al. |
| 7,094,363 B2 | 8/2006 | Christensen et al. |
| 7,105,147 B2 | 9/2006 | Kurimura et al. |
| 7,109,248 B2 | 9/2006 | Bowe |
| 7,115,670 B2 | 10/2006 | Hensman et al. |
| 7,125,818 B2 | 10/2006 | Cody et al. |
| 7,132,042 B2 | 11/2006 | Genetti et al. |
| 7,132,580 B1 | 11/2006 | Senetar |
| 7,138,047 B2 | 11/2006 | Stell et al. |
| 7,144,923 B2 | 12/2006 | Fitzpatrick |
| 7,156,978 B2 | 1/2007 | Benazzi et al. |

(56) References Cited

U.S. PATENT DOCUMENTS

| | | |
|---|---|---|
| 7,166,268 B2 | 1/2007 | Fukunaga |
| 7,166,643 B2 | 1/2007 | Lowe et al. |
| 7,166,757 B2 | 1/2007 | Fung et al. |
| 7,179,364 B2 | 2/2007 | O'Rear et al. |
| 7,195,706 B2 | 3/2007 | Abernathy et al. |
| 7,198,710 B2 | 4/2007 | Miller et al. |
| 7,199,278 B2 | 4/2007 | Fung et al. |
| 7,214,331 B2 | 5/2007 | Jiang et al. |
| 7,217,741 B2 | 5/2007 | Bowe et al. |
| 7,232,515 B1 | 6/2007 | Demmin et al. |
| 7,232,532 B2 | 6/2007 | Kramer et al. |
| 7,235,172 B2 | 6/2007 | Lawson et al. |
| 7,238,277 B2 | 7/2007 | Dahlberg et al. |
| 7,241,401 B2 | 7/2007 | Aasberg-Petersen et al. |
| 7,241,815 B2 | 7/2007 | Roy-Auberger et al. |
| 7,250,151 B2 | 7/2007 | Tonkovich et al. |
| 7,252,754 B2 | 8/2007 | DeHaan et al. |
| 7,255,840 B2 | 8/2007 | Papavassiliou et al. |
| 7,255,845 B2 | 8/2007 | Tonkovich et al. |
| 7,261,751 B2 | 8/2007 | Dutta et al. |
| 7,262,225 B2 | 8/2007 | van Berge et al. |
| 7,262,334 B2 | 8/2007 | Schmidt et al. |
| 7,271,304 B2 | 9/2007 | Du Toit |
| 7,282,137 B2 | 10/2007 | Cody et al. |
| 7,282,139 B2 | 10/2007 | Espinoza et al. |
| 7,285,206 B2 | 10/2007 | Germaine |
| 7,288,182 B1 | 10/2007 | Soled et al. |
| 7,288,689 B2 | 10/2007 | Janssen et al. |
| 7,294,253 B2 | 11/2007 | DeHaan et al. |
| 7,297,169 B2 | 11/2007 | Pham et al. |
| 7,300,565 B2 | 11/2007 | Hoek |
| 7,320,748 B2 | 1/2008 | Hemighaus et al. |
| 7,323,497 B2 | 1/2008 | Abbott et al. |
| 7,326,331 B2 | 2/2008 | Benazzi et al. |
| 7,332,072 B2 | 2/2008 | Germaine et al. |
| 7,332,147 B2 | 2/2008 | Takahashi et al. |
| 7,335,346 B2 | 2/2008 | Wang et al. |
| 2002/0115733 A1 | 8/2002 | Lapidus et al. |
| 2002/0150532 A1* | 10/2002 | Grieve et al. ........... 423/650 |
| 2004/0014826 A1 | 1/2004 | Wang et al. |
| 2004/0060239 A1* | 4/2004 | Rostrup-Nielsen et al. .. 48/198.7 |
| 2005/0191233 A1* | 9/2005 | Jiang et al. ............. 423/651 |
| 2005/0232857 A1* | 10/2005 | Lomax et al. .......... 423/652 |
| 2006/0009352 A1 | 1/2006 | Zhao et al. |
| 2006/0013759 A1 | 1/2006 | Jiang et al. |
| 2006/0090398 A1 | 5/2006 | Katikaneni et al. |
| 2008/0260631 A1 | 10/2008 | Lomax et al. |

FOREIGN PATENT DOCUMENTS

| | | |
|---|---|---|
| EP | 1586535 | * 10/2005 |
| WO | WO 02/16015 | 2/2002 |
| WO | 2008131049 | 10/2008 |
| WO | WO 2008/131049 | 10/2008 |
| WO | 2009102383 | 8/2009 |

OTHER PUBLICATIONS

Rostrup-Nielsen, "Catalytic Steam Reforming," Catalysis, Springer-Verlag: Berlin, eds. Anderson et al., 1984: pp. 46-57.
Twigg, "Chapter 5.4.6: Carbon Formation on Reforming Catalysts," Catalyst Handbook, Second Edition, Butler & Tanner: Frome, 1989: pp. 250-253.
US 6,244,357, 07/2001, Abbott (withdrawn)

* cited by examiner

HYDROGENATING PRE-REFORMER IN SYNTHESIS GAS PRODUCTION PROCESSES

This application is a continuation-in-part of co-pending U.S. application Ser. No. 12/029,826, filed on Feb. 12, 2008, which claimed the benefit of U.S. Provisional Application Ser. No. 60/912,495, filed on Apr. 16, 2007, the disclosures of which are incorporated herein in their entirety.

BACKGROUND OF THE INVENTION

Embodiments of the invention relate to processes for producing synthesis gas ("syngas"), a mixture primarily comprised of CO and H2. In particular, embodiments of the invention relate to processes for producing synthesis gas through steam reforming. Hydrogen production, as a component of synthesis gas production, is typically performed through catalytic steam reforming. The general reaction for catalytic steam reforming is as follows:

$$C_xH_yO_z + (x-z)H_2O \xrightarrow{catalyst} xCO + \left(x - z + \frac{y}{2}\right)H_2$$

Synthesis gas (including hydrogen) can be produced from methane containing feedstocks by steam methane reforming (SMR), an endothermic reaction carried out either in heat exchange reactors, or by other means where substantial heat may be transferred to the reacting fluid, such as in the case of autothermal reforming (ATR), where a portion of the feedstock is combusted inside the reactor to provide heat for steam reforming either subsequently or in the same location as the combustion. Synthesis gas can also be produced from methane containing feedstocks by CO2 ("dry") reforming, catalytic or thermal partial oxidation (CPOx or POx, respectively) and other processes known in the art. If hydrocarbon or alcohol feedstocks enriched, either naturally or by purposeful addition, in compounds with two or more carbon atoms per molecule (C2+ hydrocarbons) are used for hydrogen, or synthesis gas, generation, the risk of catalyst deactivation by carbon deposition in the hydrogen or synthesis gas generation reactor is greatly increased. As used herein, "enriched in compounds with two or more carbon atoms per molecule" generally means having greater than 5% C2+ hydrocarbons.

In order to minimize the risk of carbon deposition, existing hydrogen and synthesis gas production processes typically employ at least one adiabatic catalytic reactor prior to the synthesis gas generation reactor. These adiabatic reactors are referred to as pre-reformers.

In existing hydrogen and synthesis gas production processes employing pre-reformers and steam methane reformers, the hydrocarbon feedstock is mixed with 1 to 5% hydrogen by volume, then is subjected to a hydrodesulphurization (HDS) pre-treatment step to remove sulphur. The feedstock hydrocarbons are then mixed with superheated steam in a ratio determined by the average molecular weight of the feedstock molecules. Natural gas or other feedstocks where the average carbon number is less than two are processed with a molar steam to carbon ratio between 3:1 and 5:1. Higher molecular weight feedstocks are often processed with steam to carbon ratios as much as twice as high, between about 6:1 and 10:1. These high steam flowrates are used to suppress carbon formation, and enhance the steam reforming reaction. High steam to carbon ratios disadvantageously increase energy usage in the synthesis gas and/or hydrogen production process.

Existing hydrogen and synthesis gas production processes employing air, oxygen-enriched air, or pure oxygen feedstocks also typically mix the hydrocarbon feedstock with 1 to 5% hydrogen by volume and then conduct hydrodesulphurization to remove sulphur. Steam addition rates, expressed as a molar steam to carbon ratio, in these processes, especially when targeting production of synthesis gas with H2/CO ratios in the 2.0-2.5 range, are much lower than those employed in steam methane reforming, typically in the range of 0.5-1.0, although processes employing ratios as low as 0.2-0.4 (and lower) are known.

Because the reaction rates for steam reforming are low at the pre-reforming feed temperatures of 400° C. to 500° C., pre-reforming catalysts are prepared with very high metal loadings, above 10% by weight, and high metal surface areas. These high metal surface areas present several challenges. First, they are subject to rapid sintering and reduction of activity if feedstock temperature is not controlled very closely. Second, they present substantial safety risk due to their pyrophoric reaction with oxygen, especially when nickel metal is used, thus necessitating great care in handling the catalysts during reduction and subsequent operation. Further, even at the elevated steam to carbon ratios employed in existing steam methane reformer based hydrogen or synthesis gas production processes using pre-reformers for C2+ feedstocks, deactivation by carbon deposition remains a problem. At the much lower steam to carbon ratios typically employed in autothermal reforming or catalytic partial oxidation, deactivation by carbon deposition is especially problematic. Typically, volatile alkali or alkali-silicate promoters are added to suppress carbon deposition. Such promoters are very effective, but disadvantageously reduce catalyst reaction rate, necessitating larger pre-reforming reactors. Further, the promoters tend to volatilize and subsequently deposit on downstream catalysts and equipment. This causes deactivation of downstream catalysts and potential corrosion damage to equipment, both of which may lead to serious operation problems such as hot banding of reformer tubes, carbon deposition and eventual tube failure. Further, the protective effects of the alkali promoters are lost after they are volatilized, such that eventual pre-reformer catalyst failure is assured in such existing pre-reformers. Upon failure, the highly-reactive catalyst must be safely removed from the pre-reformer reactor and replaced.

There is a need for an improved hydrogen and synthesis gas production method that can process feedstocks containing 20% or more of molecules having at least two carbon atoms each without being deactivated by carbon deposition and without requiring the addition of excessive amounts of steam (S/C ratios of 6 to 10:1, or higher).

SUMMARY OF THE INVENTION

An embodiment of the invention provides a process having the steps of a) combining a first feed stream and a second feed stream to produce, in a pre-reforming reactor, a first product stream comprising $CH_4$ and $H_2O$; and b) feeding the first product stream into a syngas generation reactor; and reacting the first product stream in the syngas generation reactor to produce a second product stream comprising synthesis gas. In some embodiments, the first feed stream is a mixture of $H_2$ and at least one component selected from hydrocarbons having two or more carbon atoms or alcohols having two or more carbon atoms with the mixture having a hydrogen stoichiometric ratio (λ) of at least 0.1. In some embodiments, the second feed stream is steam. In some embodiments, the hydrogen stoichiometric ratio (λ) is 0.1≤λ≤1.5. In some embodiments, the hydrogen stoichiometric ratio (λ) is 0.25≤λ≤1. The syngas generation reactor may be a steam methane reformer, a $CO_2$ dry reformer, an autothermal reformer, a catalytic partial oxidation reactor or a thermal partial oxidation reactor. In some embodiments, the syngas generation reactor may be an ion transport membranes or a microchannel reactor. In some embodiments, the second product stream is produced using air, oxyen-enriched air, or nominally 100% oxygen.

In some embodiments, the process also includes c) adding a low $C_{2+}$ hydrocarbon gas to the first product stream prior to feeding the first product stream into the reforming reactor. In some embodiments, the low $C_{2+}$ gas is natural gas, wellhead gas, coal bed methane ("CBM"), gas obtained from coal gasification, gas obtained from biomass gasification or a combination thereof.

In some embodiments, the process further includes producing synthetic crude from the second product stream. In some embodiments, the process further includes producing one or more products selected from the group of lubricant basestock, middle distillate fuels, diesel, lubricants, gasoline, jet fuel, and linear alkylbenzene from the synthetic crude. In some embodiments, all or a portion of the $H_2$ in the first feed stream is obtained by chemical and/or physical separation of $H_2$ from a portion of the second product stream. In some embodiments, the step of producing the synthetic crude occurs in a Fischer-Tropsch reactor utilizing a Co- or Ru- or Fe-based Fischer-Tropsch catalyst; the Fischer-Tropsch reactor produces a tail gas; and all or a portion of the $H_2$ in the first feed stream is obtained by chemical and/or physical separation of $H_2$ from the tail gas.

In some embodiments, the process further includes producing an oxygenate from the second product stream. In some embodiments, the oxygenate may be methanol, ethanol, dimethyl ether and combinations thereof. In some embodiments, the process further includes producing one or more products selected from the group of olefins, diesel and gasoline from the oxygenate. In some embodiments, the step of producing the oxygenate occurs in an oxygenate reactor utilizing a Co- or Cu-based oxygenate catalyst; the oxygenate reactor produces a tail gas; and the tail gas is recycled as all or a portion of the first feed stream. In some embodiments, $H_2$ is obtained by chemical and/or physical separation of $H_2$ from the tail gas and added to the first feed stream.

In some embodiments, the process includes desulphurizing the first feed stream prior to feeding the first feed stream into the pre-reforming reactor. In some embodiments, the process includes feeding into the syngas generation reactor with the first product stream an additional feed stream comprising one or more members selected from the group consisting of steam, air, non-air oxidants, mixtures of desulphurized gases selected from hydrocarbons, carbon oxides, and inert gases. In some embodiments, in the pre-reforming reactor, reaction is conducted using a catalyst comprising an active metal dispersed on a support, where the active metal comprises at least one metal selected from the group consisting of Pt, Rh, Ru, Ni, Co, Pd, Ir and combinations thereof. In some embodiments, the support is at least one member selected from the group consisting of $TiO_2$, $ZrO_2$, alkaline-earth metal hexaaluminates, monoclinic zirconia and alumina. In some embodiments, the active metal is at least one member selected from the group consisting of Ir, Pt and Pd; and the support comprises at least one member selected from the group consisting of monoclinic zirconia and an alkaline-earth metal hexaaluminate. In some embodiments, the syngas generation reactor is a steam methane reformer and the molar ratio of steam to carbon atom contained in the first feed stream, S:C, is less than about 5:1. In other embodiments, S:C is less than about 4:1 or S:C is between about 3:1 to 4:1. In some embodiments, the active metal is at least one member selected from the group consisting of Ir, Pt and Pd; and the support comprises at least one member selected from the group consisting of alumina and an alkaline-earth hexaaluminate; and the catalyst further comprises one or more rare earth oxide promoters. In some embodiments, the catalyst is in a form such as powders, granulates, tablets, extrudates, and washcoats on ceramic or metallic monoliths, or tubular or plate/corregated plate structures.

In some embodiments, the first feed stream is introduced into the pre-reforming reactor prior to the second feed stream being introduced. In other embodiments, the second feed stream is introduced into the pre-reforming reactor prior to the first feed stream being introduced. In still other embodiments, the first feed stream and second feed stream are introduced into the pre-reforming reactor simultaneously. In some embodiments, the first feed stream and second feed stream are combined prior to introduction into the pre-reforming reactor. In some embodiments, the process is utilized at a production location utilizing a mobile catalyst activation and/or regeneration process.

In some embodiments, the first feed stream has more than 5%, more than 10%, or more than 20% hydrocarbons and/or alcohols having two or more carbon atoms.

In some embodiments, the syngas generation unit is modular and transportable. In other embodiments, the second product stream is produced in a unit that is modular and transportable.

DETAILED DESCRIPTION OF PREFERRED EMBODIMENTS

It is noted that within the context of embodiments of the invention the designations "first feed stream" and "second feed stream" are used to distinguish the two feedstreams, but does not designate their order of addition into the pre-reforming reactor. Hence the "first feed stream" can be introduced into the pre-reforming reactor either before, after or simultaneously with the "second feedstream" or the first and second feedstreams can be combined prior to introduction into the pre-reforming reactor (or "pre-reformer") as a single combined feed.

The first feed stream comprises a mixture of $H_2$ and predominantly methane, being enriched in C2+ hydrocarbons (or more generally "hydrocarbons"), the mixture having a hydrogen stoichiometric ratio (λ), as defined herein, of at least 0.1. In some embodiments the first feed stream is primarily comprised of methane. The second feed stream comprises steam.

Figure 1:
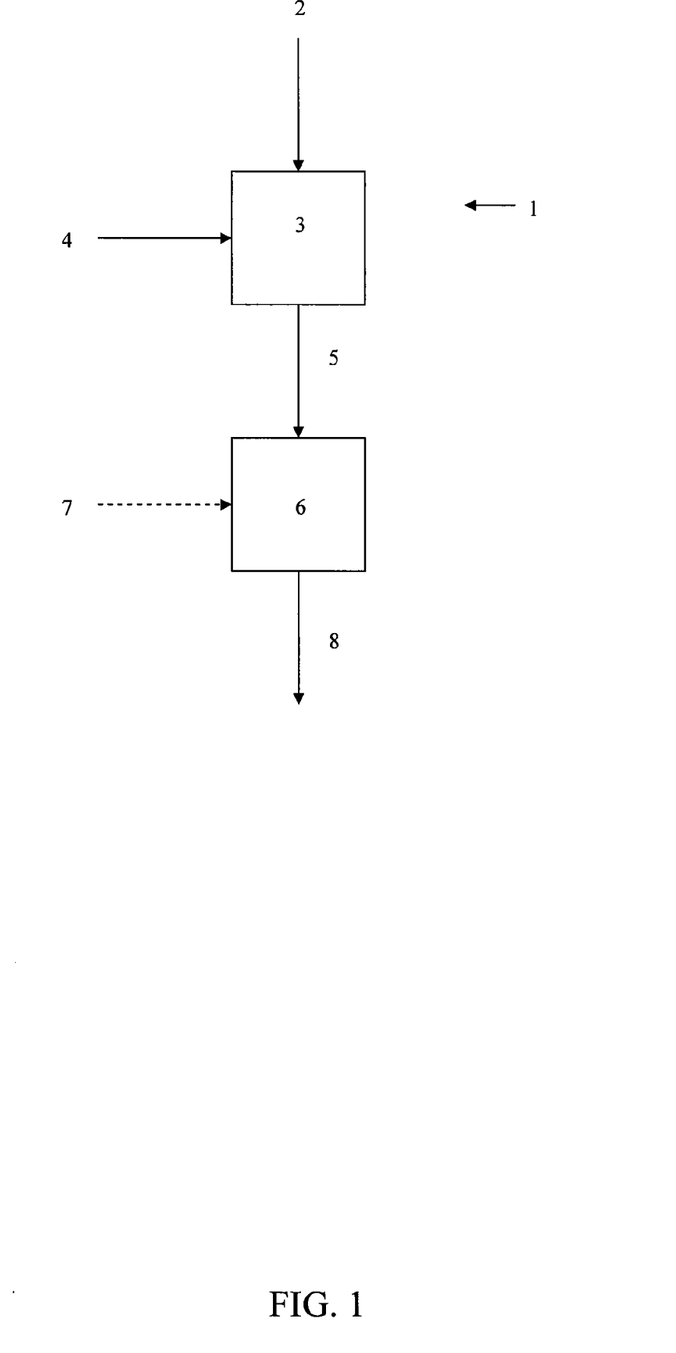
FIG. 1 is a schematic diagram of a first embodiment of the inventive process.

One embodiment of the invention is shown in FIG. 1 illustrating a typical hydrogen and/or synthesis gas production process 1, in which the first feed stream 2 is co-fed to pre-reforming reactor 3 with the second feed stream which comprises steam 4. The product from the pre-reforming reactor 3 is the first product stream 5 and comprises $CH_4$ and $H_2O$. The first product stream 5 is fed to the reforming reactor 6, with or without the additional feed 7. Additional feed 7 may include further steam injection, air or other non-air oxidant injection, mixtures of desulphurized gases such as hydrocarbons, carbon oxides, or inerts, for instance as is practiced in reforming for the production of synthesis gas. The product from the reforming reactor 6 is the second product stream 8 and comprises synthesis gas, i.e., a mixture comprising CO and $H_2$. The second product stream 8 exits the reforming reactor 6 and may be further processed as discussed herein.

Figure 2:
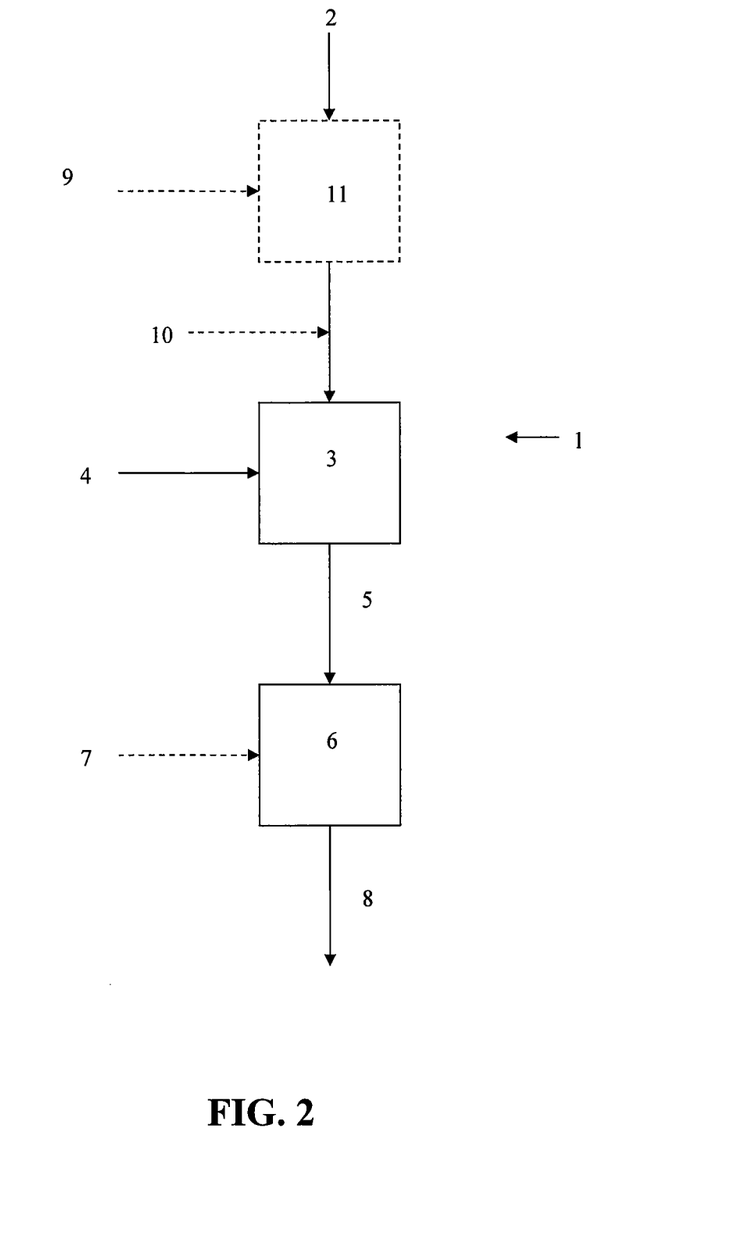
FIG. 2 is a schematic diagram of a second embodiment of the inventive process.

Optionally, as shown in FIG. 2, the first feed stream 2 can be treated in a desulphurizing process 11. If the first feed stream 2 possesses bound organic sulphur compounds, including but not limited to mercaptans and thiols, then the desulphurizing process 11 usually includes a hydrogenation step, and a hydrogen-containing gas 9 is added to the desulphurizing process 11 to facilitate sulphur removal. The generalized hydrogen and/or synthesis gas production process 1 illustrated in FIG. 2 can be used to describe both known hydrogen and/or synthesis gas production process for C2+ feedstocks and embodiments of the invention. In embodiments of the invention, the first feed stream 2 has a hyrogen stoichiometric ratio, λ of at least 0.1.

The pre-reforming reactor 3 is preferably operated at temperatures from 350° C. to 600° C. inlet temperature both in embodiments of the invention. To minimize sulphur poisoning, the pre-reforming reactor 3 in some embodiments may be operated at temperatures of 400° C. or higher. To minimize coke formation, the pre-reforming reactor may be operated at or below 550° C. in some embodiments. Operating pressures for the pre-reforming reactor 3 may be between atmospheric pressure and 50 MPa. Common industrial processes are operated between essentially atmospheric pressure and 5 MPa. These typical operating conditions are recited in Twigg, supra, and Rostrup-Nielsen, J. R., *Catalytic Steam Reforming*, Reprint from *Catalysis-Science and Technology*, Springer-Verlag, 1984, hereby incorporated by reference, among other sources.

In embodiments of the invention, the amount of hydrogen contained in the first feed stream 2 is increased compared to known processes. The proportion of hydrogen employed in the first feed stream 2 can be best described by a "hydrogenation stoichiometric ratio," or "hydrogen stoichiometry," λ, for the hydrogenation reaction of a given hydrocarbon to methane. To define λ, it is convenient to represent the average chemical composition of the molecules in a feed mixture containing hydrocarbons and oxygenated species as $C_xH_yO_z$, where $$x = \sum_i n_i x_i$$

$$y = \sum_i n_i y_i$$

$$z = \sum_i n_i z_i$$

and
i is the number of molecular species in the mixture;
$n_i$ is the mole fraction of the i-th molecular species in the mixture; and
$x_i$, $y_i$ and $z_i$ are the mole fractions of C, H and O, respectively, in the i-th molecular species. The hydrogen stoichiometry, λ, is then defined in terms of molar flow rates, $F_M$ (where M indicates the species, e.g., $H_2$ and/or $C_xH_yO_z$, to the hydrogen and/or synthesis gas production process as follows:

$$C_xH_yO_z + \left(2x - \frac{y}{2} + z\right)H_2 \xrightarrow{catalyst} xCH_4 + zH_2O$$

$$\lambda = \frac{F_{H_2}}{F_{C_xH_yO_z}\left(2x - \frac{y}{2} + z\right)}$$

For typical hydrocarbon feedstocks, molecules containing other atoms such as nitrogen or sulphur may be present, but the concentration of these molecules is not generally high. Known pre-reforming reactors operating with 1% to 5% dihydrogen by volume as a ratio to the hydrocarbon feed (which has typically been added prior to and for the hydrocarbon feed hydrodesulphurization step discussed earlier), for a nominal 100% (i.e., about 95-100%) propane feed ($C_3H_8$) would possess a hydrogen stoichiometry, λ, of between 0.005 and 0.026.

In one embodiment of the present invention, the hydrogen stoichiometry, λ, is preferably at least 0.1. In another embodiment of the present invention, λ is greater than or equal to 0.2, and also less than or equal to 1.5. In another embodiment of the present invention, λ is greater than or equal to 0.25, and also less than or equal to 1. The increased amount of hydrogen in embodiments of the present invention, necessary to achieve the correct hydrogen stoichiometry, may be added prior to the desulphurizing process 11 as part of hydrogen-containing gas 9, or it may be added prior to the pre-reforming reactor 3 as stream 10. Further, distributed injection of the hydrogen may be practiced throughout the pre-reforming reactor 3. The relative amounts of hydrogen added at any of these locations does not limit the application of embodiments of the inventive process.

As noted above, when the level of added hydrogen is at low hydrogen stoichimetry (i.e., λ is less than 0.1), as is employed in known processes, the catalyst may be readily deactivated by carbon formation and deposition, especially at the lower steam to carbon feed ratios typically employed for synthesis gas production. At very high hydrogen stoichiometry (i.e., λ is greater than 1.5), the equilibrium for the subsequent steam methane reforming and water gas shift reactions is adversely affected. In a preferred embodiment of the invention, molecular hydrogen ($H_2$) is added in amounts to provide a hydrogen stoichiometry of 0.1<λ<1.5, resulting in suppression of catalyst deactivation and rapid reaction of C2+ molecules to C1 (methane) product.

Embodiments of the invention promote the hydrogenation reaction. This reaction is exothermic, whereas the steam reforming reaction is endothermic. Thus, embodiments of the inventive process compensate for the usual subsequent drop in temperature, and thus reaction rate, typically observed in known synthesis gas production methods. Furthermore, embodiments of the inventive method can be employed to obtain a temperature increase in the pre-reforming reactor 3. This temperature increase promotes the hydrogenation reaction rate and both the rate and equilibrium limits to the steam reforming reaction. Thus, embodiments of the inventive process increase conversion of C2+ hydrocarbons and alcohols via hydrogenation while also enhancing the rate and extent of conversion possible through the steam reforming reaction in the same reactor.

Embodiments of this invention are particularly beneficial for synthesis gas production processes which typically employ low (less than 1.0) and very low (less than 0.6) steam to carbon ratios for synthesis gas H2/CO ratio control. For operation with natural gas feedstocks enriched in C2+ hydrocarbons, traditional pre-reforming technology often requires pre-reformer operation with steam to carbon ratios significantly higher than those required for the downstream synthesis gas generation process. Existing technology solutions for this situation typically involve: (1) operation of the pre-reformer at significantly lower steam to carbon ratios than required thereby increasing the risk of carbon deposition in the pre-reformer; (2) operation of the synthesis gas production process at significantly higher steam to carbon ratios than desired thereby producing a synthesis gas containing excess H2, which may need to be removed prior to downstream processing, especially for FT synthesis processes; (3) feeding additional/higher concentrations of CO2 to counter the effects of this "extra" steam on the product synthesis gas H2/CO ratio, and/or (4) cooling the pre-reformer effluent to condense and remove the excess steam, followed by reheating the synthesis gas reactor feed stream, which involves the addition of a number of heat exchangers and vessels as well as a significant decrease in process efficiency.

The inventive method is not catalyst specific and can be applied to various pre-reforming catalysts known and normally used in the art.

In a preferred embodiment, the pre-reformer catalyst has an active component supported on a non-reducible oxide support. Suitable active components include, but are not limited to, Pt, Rh, Ru, Ni, Co, Pd, Ir and any combination thereof. Suitable supports include, but are not limited to, $TiO_2$, $ZrO_2$, alkaline-earth metal hexaaluminates (preferably barium hexaaluminate), monoclinic zirconia or alumina. The support of the preferred catalyst has a preferred surface area of from 10 to 250 $m^2/g$, preferably from 80 to 180 $m^2/g$.

One preferred catalyst formulation is described in U.S. Patent Application Publication No. US 2005/0232857, the contents of which is incorporated by reference herein in its entirety, and contains as active metal at least one of Ir, Pt and Pd, on a support of monoclinic zirconia or an alkaline-earth metal hexaaluminate.

The oxide support of a preferred catalyst can optionally include one or more surface area stabilizers. Suitable surface area stabilizers include, but are not limited to, REO (La, Ce, Pr, Nd, Sm), Zr, Y, Ti, Sc and combinations thereof. Such stabilizers can be present in the support in an amount from 0 to 30% by weight, preferably from 5 to 20% by weight, based on amount of support.

The preferred catalyst formulations can be provided in any desired physical form. Preferably the supported catalyst is in a form selected from the group consisting of powders, granulates, tablets, extrudates, and washcoats on ceramic or metallic monoliths, or tubular or plate/corregated plate structures.

In a further embodiment of the invention when used in combination with a downstream steam reforming process for hydrogen and/or high H2/CO ratio syngas production, the pre-reforming process is performed with a molar ratio of steam per carbon atom in the first feed stream, S:C, that is less than 5, preferably less than 4, more preferably between 3 and 4. By using the hydrogen stoichiometry of the inventive process, $\lambda \geq 0.1$, the process enables the use of hydrocarbon feedstocks having higher molecular weight (C2+ enriched), with low steam to carbon ratios being useable.

Other preferred embodiments of the invention include additional downstream processing following the hydrogenation pre-reforming using the hydrogen stoichiometry of the inventive process. In some embodiments of the invention, the conversion of the first product stream 5 in reactor 6 may include steam reforming, autothermal reforming, catalytic or thermal partial oxidation and/or combinations thereof to produce synthesis gas. Such synthesis gas production processes are known and disclosed in U.S. Pat. Nos. 7,335,346; 7,332,147; 7,323,497; 7,297,169; 7,262,334; 7,261,751; 7,255,840; 7,250,151; 7,241,401; 7,232,532; 7,214,331; 7,166,268; 7,105,147; 7,094,363; 7,090,826; 7,087,651; 7,087,192; 7,074,347; 7,067,560; 7,056,488; 7,037,485; 7,033,569; 6,984,371; 6,958,310; 6,953,488; 6,793,700; 6,761,838; 6,749,828; 6,730,285; 6,702,960; 6,695,983; 6,693,060; 6,680,006; 6,673,270; 6,669,744; 6,635,191; 6,609,562; 6,607,678; 6,534,551; 6,527,980; 6,525,104; 6,492,290; 6,489,370; 6,488,907; 6,475,409; 6,461,539; 6,458,334; 6,455,597; 6,409,940; 6,402,989; 6,402,988; 6,387,843; 6,376,423; 6,375,916; 6,355,219; 6,340,437; 6,338,833; 6,312,660; 6,312,658; 6,254,807; 6,224,789; 6,214,066; 6,174,460; 6,155,039; 6,153,163; 6,143,203; 6,143,202; 6,114,400; 6,085,512; 6,077,323; 6,048,472; 6,007,742; 5,993,761; 5,989,457; 5,980,840; 5,980,782; 5,980,596; 5,958,364; 5,935,489; 5,931,978; 5,883,138; 5,855,815; 5,753,143; 5,720,901; 5,714,132; 5,658,497; 5,654,491; 5,653,916; 5,653,774; 5,648,582; 5,637,259; 5,591,238; 5,554,351; 5,500,149; 5,431,855; 5,310,506; 5,252,609; 5,149,464; 5,068,057; 4,985,230; 4,861,351; 4,836,831; 4,767,569; 4,681,701; 4,048,250; 3,573,224; 3,429,678; 3,250,601; 2,942,958; 2,772,149; 2,765,222; 2,684,895; 2,683,152; 2,676,156; 2,665,199; 2,662,004; 2,638,452; 2,635,952; 2,632,690; 2,622,089; 2,543,791; 2,541,657; 2,529,630; 2,522,468; and 2,520,925, the disclosures of which are incorporated herein in their entirety by reference. Some methods of producing synthesis gas utilizing autothermal oxidation employ air or oxygen-enriched air. Such methods are disclosed in U.S. Pat. Nos. 5,733,941; 5,861,441; 6,130,259; 6,169,120; 6,172,124; 6,239,184; 6,277,894; and 6,344,491, the disclosures of which are incorporated herein in their entirety by reference. Yet other methods of producing synthesis gas include the use of oxygen/ion transport membranes, such as the processes disclosed in U.S. Pat. Nos. 6,881,394; 6,402,988; 6,695,983; 6,214,055; 6,114,400; 6,077,323; 6,066,307; and 6,048,472, the disclosures of which are incorporated herein in their entirety by reference. If more than one such synthesis gas production process is utilized, the synthesis gas production processes may be operated serially to or in parallel with each other.

Figure 3:
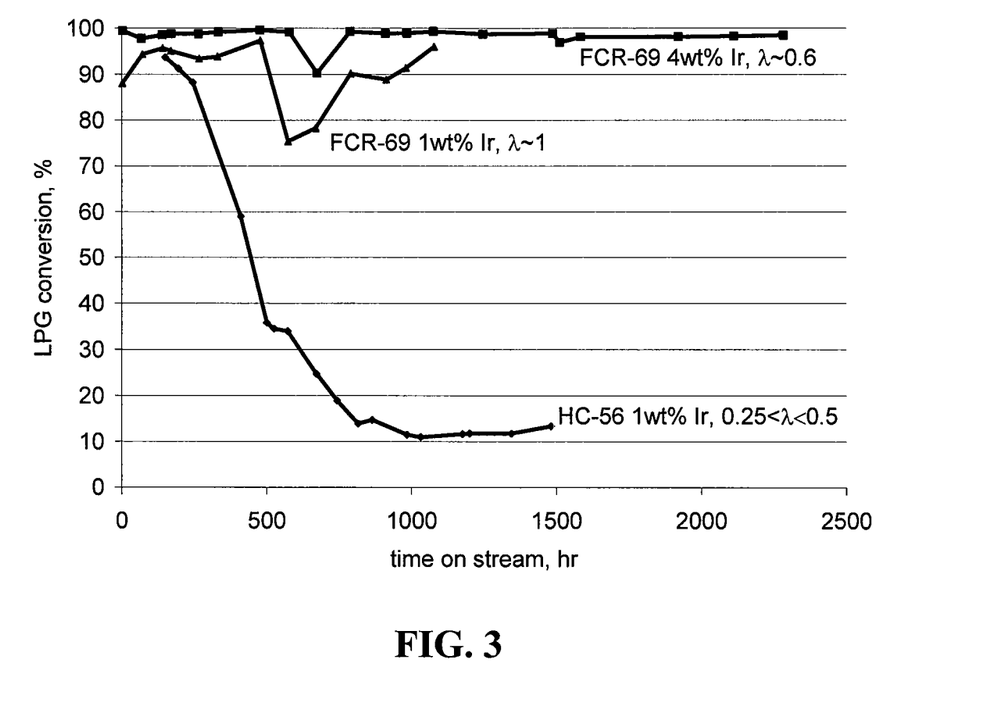
FIG. 3 is a propane conversion versus time plot for catalysts according to an embodiment of the invention.

In some embodiments of the invention the product 8 of reforming reactor 6 is further processed to produce a mixture primarily comprised of liquid hydrocarbons, i.e., C5+, or synthetic crude. For example, the synthesis gas product of reactor 6 may be processed in a reactor 13, as shown in FIG. 3. In some embodiments, reactor 13 is a Fischer-Tropsch reactor, as is known in the art. Processes for the production of synthetic crude are known in the art, including for example, in U.S. Pat. Nos. 7,294,253; 7,262,225; 7,241,815; 7,217,741; 7,115,670; 7,109,248; 7,084,180; 7,067,561; 7,067,560; 7,067,559; 7,045,554; 7,045,486; 7,037,947; 7,011,760; 7,001,927; 6,982,287; 6,977,237; 6,942,839; 6,964,398; 6,946,493; 6,872,753; 6,864,293; 6,809,122; 6,797,243; 6,784,212; 6,750,258; 6,730,708; 6,716,887; 6,638,889; 6,558,634; 6,512,018; 6,491,880; 6,479,557; 6,465,530; 6,451,864; 6,403,660; 6,353,035; 6,319,872; 6,344,491; 6,284,807; 6,262,131; 6,235,798; 6,214,890; 6,211,255; 6,180,684; 6,147,126; 6,121,333; 6,103,773; 6,075,061; 6,060,524; 6,043,288; 5,981,608; 5,958,986; 5,905,094; 5,869,541; 5,844,005; 5,817,701; 5,783,607; 5,776,988; 5,770,629; 5,756,419; 5,422,375; 5,348,982; 5,227,407; 5,169,869; 5,135,958; 5,116,879; 5,037,856; 4,978,689; 4,906,671; 4,788,222; 4,686,238; 4,686,313; 4,652,587; 4,640,766; 4,613,624; 4,605,680; 4,605,679; 4,605,676; 4,599,481; 4,594,172; 4,585,798; 4,523,047; 4,492,774; 4,423,265; 4,418,155; 4,399,234; 4,385,193; 4,157,338; 4,088,671; 4,086,262; 4,042,614; 2,957,902; 2,818,418;

2,805,239; and 2,771,481; the disclosures of which are incorporated in their entirety herein by reference.

In yet other embodiments of the invention, additional downstream treatments or product upgrading are utilized to further treat the synthetic crude. As used herein, the term "product upgrading" refers to any subsequent processing or treatment of the synthetic crude to produce an intermediate or end product, including for example, lubricant basestock, lubricants, greases, middle distillate fuels, diesel, linear alkylbenzenes, aviation and jet fuels, gasoline, and other chemicals, i.e., normal- and-iso paraffinic solvents. Such product upgrading methods are disclosed for example in U.S. Pat. Nos. 7,332,072; 7,326,331; 7,320,748; 7,300,565; 7,294,253; 7,288,182; 7,285,206; 7,282,139; 7,282,137; 7,271,304; 7,252,754; 7,238,277; 7,235,172; 7,232,515; 7,198,710; 7,195,706; 7,179,364; 7,156,978; 7,138,047; 7,132,042; 7,125,818; 7,074,320; 7,053,254; 7,033,552; 7,018,525; 6,962,651; 6,939,999; 6,900,366; 6,841,711; 6,833,064; 6,824,574; 6,822,131; 6,797,154; 6,787,022; 6,784,329; 6,768,037; 6,755,961; 6,743,962; 6,727,399; 6,723,889; 6,703,535; 6,702,937; 6,700,027; 6,693,138; 6,686,511; 6,669,743; 6,663,768; 6,635,681; 6,607,568; 6,605,206; 6,602,840; 6,583,186; 6,544,407; 6,515,034; 6,515,032; 6,475,960; 6,458,265; 6,420,618; 6,383,366; 6,375,830; 6,332,974; 6,309,432; 6,296,757; 6,190,532; 6,180,842; 6,179,994; 6,162,956; 6,096,940; 6,025,305; 5,993,644; 5,976,351; 5,888,376; 5,882,505; 5,766,274; 5,750,819; 5,378,348; 5,362,378; 5,246,566; 5,135,638; 4,995,962; 4,975,177; 4,943,672; 4,919,786; 4,520,215; 4,513,156; 4,500,417; 4,385,193; 4,234,412; 4,126,644; 4,071,574; 4,059,648; 4,044,064; 4,041,096; 4,041,095; 3,329,602; 3,268,436; 3,255,101; 3,239,455; 3,224,956; 3,193,490; 3,044,949; 3,001,857; 2,847,358; 2,761,871; 2,752,382; and 2,741,649, the disclosures of which are incorporated by reference herein in their entirety.

In yet other embodiments of the inventive method, the first product stream 5 may be mixed with other hydrocarbon sources prior to or concurrently with introduction into the reforming reactor 6 or other downstream treatments. Such other hydrocarbon sources may include, without limitation, wellhead gas. The term "wellhead gas" as used in the specification and claims refers to any gas at the location of the wellhead (the assembly of fittings, valves, and controls located at the surface and connected to the flow lines, tubing, and casing of the well so as to control the flow from the reservoir), whether it is called "wellhead gas", "casing head gas", "residue gas" or the like. The other hydrocarbon source may also include any gas comprising methane and hydrogen, carbon monoxide and/or carbon dioxide, such as gas resulting from, for example, coal gasification and/or biomass gasification processes.

In yet other embodiments of the invention, the second product stream 8 is further processed to produce one or more oxygenates. As used herein, the term oxygenate means any of (1) ethers, including, for example, ethyl tert-butyl ether (ETBE), diisopropyl ether (DIPE), dimethyl ether (DME), methyl tert-butyl ether (MTBE), tert-amyl ethyl ether (TAEE), tert-amyl methyl ether (TAME); and (2) methanol and $C_{2+}$ alcohols, including for example, ethanol (EtOH), propanol, butanol, tert-amyl alcohol (TAA), and tert-butyl alcohol (TBA).

A number of different oxygenate synthesis processes currently known in the art (especially for methanol synthesis), the majority of such processes utilize fixed bed reactors, whether tray, tube-shell, annular, radial, or microchannel. However, three-phase slurry methanol and/or dimethyl ether (DME) synthesis are also known. Known oxygenate synthesis processes are disclosed, for example, in U.S. Pat. Nos. 7,288,689; 7,255,845; 7,144,923; 7,067,558; 7,033,972; 7,015,255; 7,014,835; 6,969,505; 6,894,080; 6,881,759; 6,875,794; 6,800,665; 6,608,114; 6,486,218; 6,433,029; 6,387,963; 6,300,380; 6,255,357; 6,218,439; 6,191,175; 6,069,180; 5,908,963; 5,767,039; 5,753,716; 5,627,295; 5,530,168; 5,512,599; 5,508,246; 5,424,335; 5,287,570; 5,284,878; 5,262,443; 5,219,891; 5,218,003; 5,216,034; 5,179,129; 5,169,869; 5,096,688; 5,063,250; 4,910,227; 4,886,651; 4,876,286; 4,873,267; 4,868,221; 4,812,433; 4,791,141; 4,780,481; 4,766,155; 4,766,154; 4,725,626; 4,666,944; 4,628,066; 4,609,678; 4,540,713; 4,537,909; 4,521,540; 4,521,248; 4,520,216; 4,507,403; 4,481,305; 4,481,012; 4,477,594; 4,476,250; 4,460,378; 4,455,394; 4,444,909; 4,417,000; 4,238,403; 3,950,369; 3,940,428; and 3,939,191.

Additional processing of oxygenates to produce a wide range of products including, for example, olefins, diesel and gasoline, may be undertaken in some embodiments of the invention. Such additional processing of oxygenates are disclosed in U.S. Pat. Nos. 7,199,278; 7,166,757; 7,132,580; 7,078,578; 6,852,897; 6,800,665; 6,768,034; 6,740,783; 6,710,218; 6,632,971; 6,613,951; 6,608,114; 6,534,692; 6,486,219; 6,444,869; 6,399,844; 6,372,949; 6,303,839; 6,191,175; 6,166,282; 6,049,017; 6,045,688; 5,990,369; 5,952,538; 5,750,799; 5,744,680; 5,723,401; 5,714,662; 5,602,289; 5,573,990; 5,545,791; 5,491,273; 5,367,100; 5,316,627; 5,238,898; 5,233,117; 5,191,142; 7,199,278; 7,166,757; 7,132,580; 7,078,578; 6,852,897; 6,800,665; 6,768,034; 6,740,783; 6,710,218; 6,632,971; 6,613,951; 6,608,114; 6,534,692; 6,486,219; 6,444,869; 6,399,844; 6,372,949; 6,303,839; 6,191,175; 6,166,282; 6,121,503; 6,049,017; 6,045,688; 5,990,369; 5,952,538; 5,750,799; 5,744,680; 5,723,401; 5,714,662; 5,602,289; 5,573,990; 5,545,791; 5,491,273; 5,367,100; 5,316,627; 5,238,898; 5,233,117; 5,191,142; 5,191,141; 5,177,279; 5,167,937; 5,130,101; 5,095,163; 5,095,159; 5,047,070; 5,045,287; 5,041,690; 5,028,400; 4,985,203; 4,981,491; 4,935,568; 4,929,780; 4,899,002; 4,898,717; 4,873,390; 4,857,667; 4,849,575; 4,831,195; 4,814,536; 4,814,535; 4,788,377; 4,788,369; 4,788,365; 4,788,042; 4,689,205; 4,684,757; 4,628,135; 4,590,320; 4,579,999; 4,560,807; 4,550,217; 4,513,160; 4,496,786; 4,476,338; 4,449,961; 4,410,751; 4,404,414; 4,393,265; 4,337,336; 4,058,576; 4,052,479; 4,035,430; 4,025,576; 4,025,575; 3,998,898; 3,972,958; and 2,793,241; the disclosures of which are incorporated by reference herein in their entirety.

In yet other embodiments of the invention, the process is conducted at a production location utilizing a mobile catalyst activation and/or regeneration process, such as those processes disclosed in U.S. application Ser. Nos. 12/029,826 and 60/912,495, the disclosures of which are incorporated by reference herein in their entirety. A production location may be located in an industrialized or remote area and may include a natural gas and/or petroleum pumping location, a coal field, and/or a location possessing a biomass source.

In embodiments of the invention, the source of the added hydrogen may be external to the synthesis gas production unit, such as merchant hydrogen procured in high pressure storage cylinders, trailers, or pipeline, as either a liquid or a gas. In other embodiments of the invention the hydrogen could be produced locally external to the synthesis gas production unit. In a preferred embodiment employing the product synthesis gas for downstream methanol synthesis and/or iron catalyzed Fischer-Tropsch synthesis, especially at a remote locations, the methanol and/or FT synthesis tail gas, which typically contains >50% by volume hydrogen, may be added directly to the hydrocarbon feed stream as the hydrogen source. In other preferred embodiments the added hydrogen may be produced from any number of different hydrogen containing streams within the synthesis gas production and/or oxygenate/FT synthesis units through either chemical or physical means. Examples of locations of hydrogen sources and/or methods of hydrogen production from these sources (generally for other purposes) in GTL plants are described in U.S. Pat. Nos. 5,844,005, 6,043,288, 6,103,773, 6,147,126, 6,946,493, 6,958,363, and 7,166,643; the disclosures of which are incorporated by reference herein in their entirety.

EXAMPLES

The following Examples illustrate certain specific embodiments of the disclosed invention and should not be construed as limiting the scope of the invention as many variations are possible within the disclosed invention, as will be recognized by those skilled in the art.

Example 1

Propane was used as hydrocarbon feedstock having three carbon atoms. A pre-reforming reactor having 1.4" ID was loaded with 10 g of catalyst having 1 wt % Ir deposited on a non-reducible oxide support comprising barium hexaaluminate, making an approximately 1 cm deep catalyst bed. The pre-reforming reaction was conducted under nearly adiabatic conditions. Two ~2 cm deep layers of 3 mm glass beads were placed below and above the catalyst bed to provide uniform flow of the first and second feedstreams (i.e., reacting gasses) through the bed. Two thermocouples were installed just below and above the catalyst bed to measure the temperature differential across the catalyst.

The pre-reforming reactor was placed in a furnace and the furnace temperature was set constant at 450° C. Propane and steam flows were constant at a molar steam to carbon ratio, or S:C, of 3.7. Hydrogen flow was changed stepwise between hydrogen stoichiometry $\lambda$ of 1.5, 1.0, 0.5, 0.25 and 0.13. Overall gas space velocity was approximately 35,000 l/hr. The reactor was stabilized for about 1 hour at each step before acquiring a sample of the product, i.e., reformate, gas and switching to the next setting for $H_2$ flow. After the first set of testing the catalyst was aged overnight under the reaction conditions with highest hydrogen gas flow and then the measurements were repeated the next day.

Table 1 shows conversion of $C_3H_8$ into $C_1$ species ($CH_4$ and $CO_2$, below detectable amounts of CO were observed for all samples) and $\Delta T$ between inlet and outlet ($T_{in}-T_{out}$) of the catalyst (negative sign indicates temperature increase over the catalyst). Increasing negative values of $\Delta T$ indicate a high degree of the exothermic methanation reaction according to the present invention, whereas high positive values of $\Delta T$ indicate endothermic steam reforming reaction dominates the observed conversion of the propane feedstock.

TABLE 1

| Hydrogen stoichiometry, $\lambda$ | $C_3H_8$ conversion | $\Delta T$ |
|---|---|---|
| 1.5 | 95 | −56 |
| 1 | 93 | −47 |
| 0.5 | 91 | −31 |
| 0.25 | 87 | −20 |
| 0.13 | 83 | −13 |
| After aging overnight | | |

TABLE 1-continued

| Hydrogen stoichiometry, $\lambda$ | $C_3H_8$ conversion | $\Delta T$ |
|---|---|---|
| 1.5 | 95 | −60 |
| 1 | 93 | −48 |
| 0.5 | 91 | −34 |
| 0.25 | 87 | −22 |
| 0.13 | 83 | −14 |

In all cases, the addition of hydrogen gas according to the inventive method achieves extensive conversion of C2+ hydrocarbons in the feedstock and exhibits exothermic reaction consistent with the desired methanation reaction.

Example 2

The catalyst of Example 1 was aged for about 1500 hrs in a steam methane reforming (SMR) reaction. The catalyst was then removed and loaded into the pre-reforming reactor of Example 1. The same testing procedure was used as described above. Table 2 shows the results for the second catalyst testing.

TABLE 2

| Hydrogen stoichiometry, $\lambda$ | $C_3H_8$ conversion | $\Delta T$ |
|---|---|---|
| 1.5 | 30 | −21 |
| 1 | 23 | −14 |
| 0.5 | 13 | −1 |
| 0.25 | 5 | 10 |
| 0.13 | 1 | 12 |
| After aging overnight | | |
| 1.5 | 19 | −11 |
| 1 | 16 | −5 |
| 0.5 | 9 | 3 |
| 0.25 | 4 | 9 |
| 0.13 | 1 | 10 |

For an aged catalyst, the inventive method yields a surprising increase in C2+ hydrocarbon conversion with increasing hydrogen stoichiometry, $\lambda$. Furthermore, the exothermic temperature change increases with increased hydrogen stoichiometry within the inventive range.

Example 3

Ten grams of fresh FCR-69-4 catalyst obtained from Sud-Chemie Corporation was loaded into the pre-reforming reactor of Example 1. The testing procedure of Example 1 was used as described above, with results shown in Table 3. This catalyst has a metal loading of approximately 4 wt % Iridum on an alumina carrier promoted with a mixture of rare earth oxides, namely, $CeO_2$ at 14-20 wt %, $La_2O_3$ at 1-5 wt %, and $Y_2O_3$ at 1-5 wt %, based on amount of catalyst.

TABLE 3

| Hydrogenation stoichiometry of feed, $\lambda$ | $C_3H_8$ conversion | $\Delta T$ |
|---|---|---|
| 1.5 | 94 | N/A |
| 1 | 92 | N/A |
| 0.5 | 87 | N/A |
| 0.25 | 81 | N/A |
| 0.13 | 76 | N/A |
| After aging overnight | | |

TABLE 3-continued

| Hydrogenation stoichiometry of feed, λ | $C_3H_8$ conversion | ΔT |
|---|---|---|
| 1.5 | 88 | N/A |
| 1 | 86 | N/A |
| 0.5 | 80 | N/A |
| 0.25 | 73 | N/A |
| 0.13 | 67 | N/A |

Example 4

Ten grams of fresh FCR-69-1 catalyst obtained from Sud-Chemie Corporation was loaded into the pre-reforming reactor of Example 1. FCR-69-1 has active metal loading of 1 wt % but is otherwise identical to the FCR-69-4 catalyst of the Example 3. The testing procedure of Example 1 was used as described above testing, and the results are shown in Table 4. Even with a reduction in metal loading to ¼ of the value in Example 3, extensive conversion of feed was achieved in proportion to the hydrogen stoichiometry.

TABLE 4

| Hydrogen stoichiometry, λ | $C_3H_8$ conversion | ΔT |
|---|---|---|
| 1.5 | 92 | −66 |
| 1 | 81 | −59 |
| 0.5 | 58 | −34 |
| 0.25 | 20 | 0 |
| 0.13 | 11 | 8 |
| After aging overnight | | |
| 1.5 | 57 | −55 |
| 1 | 54 | −49 |
| 0.5 | 32 | −17 |
| 0.25 | 14 | 2 |
| 0.13 | 6 | 8 |

FIG. 2 shows the relative conversion $C_3H_8$ versus time for the rare earth oxide promoted catalyst of Example 3 and 4 versus the unpromoted catalyst of Examples 1 and 2. The rare earth oxide promoted catalyst shows a surprising advantage in deactivation rate compared to the unpromoted catalyst. However, the hydrogen stoichiometry λ for the promoted catalysts was uniformly higher than that for the unpromoted catalyst, such that the effects of increased hydrogen stoichiometry and catalyst composition can not be readily separated. In all cases, catalysts provided with hydrogen stoichiometries below the inventive range deactivated within less than two days onstream over multiple tests at different metal loadings and steam to carbon ratios. Both the promoted and unpromoted catalysts possess substantially lower active metal loadings than catalysts used in known pre-reforming reactions. Further, neither catalyst is promoted with alkaline earth promoters with their attendant challenges.

What is claimed is:

1. A process comprising:
    combining a first feed stream and a second feed stream to produce, in a prereforming reactor, a first product stream comprising $CH_4$ and $H_2O$, wherein:
        the first feed stream comprises a mixture of $H_2$ and at least one component selected from the group consisting of hydrocarbons having two or more carbon atoms and alcohols having two or more carbon atoms, wherein more than 5% of the first feed stream comprises said hydrocarbons and/or alcohols having two or more carbon atoms and the amount of hydrogen is such that the first feed stream has a hydrogen stoichiometric ratio (λ) in the range of 0.1≤λ≤1.5; and
        the second feed stream comprises steam, wherein the molar ratio of steam to carbon atom contained in the combined first and second feed stream, S:C, is between about 3:1 to 4:1;
        so that an exothermic hydrogenation reaction takes place when the first and the second feed streams are combined in the prereforming reactor;
    feeding the first product stream into a syngas generation reactor; and
    reacting the first product stream in the syngas generation reactor to produce a second product stream comprising synthesis gas.

2. The process of claim 1 further comprising:
    adding a low C2+ hydrocarbon gas to the first product stream prior to feeding the first product stream into the syngas generation reactor.

3. The process of claim 2 wherein the low C2+ gas is natural gas, wellhead gas, coal bed methane ("CBM"), gas obtained from coal gasification, gas obtained from biomass gasification or a combination thereof.

4. The process of claim 1 further comprising: producing synthetic crude from the second product stream.

5. The process of claim 4 further comprising:
    producing one or more products selected from the group of lubricant basestock, middle distillate fuels, diesel, lubricants, gasoline, jet fuel, and linear alkylbenzene from the synthetic crude.

6. The process of claim 4 wherein all or a portion of the $H_2$ in the first feed stream is obtained by chemical and/or physical separation of $H_2$ from a portion of the second product stream.

7. The process of claim 4 wherein:
    (a) the step of producing the synthetic crude occurs in a Fischer-Tropsch reactor utilizing a Co- or Ru- or Fe-based Fischer-Tropsch catalyst;
    (b) the Fischer-Tropsch reactor produces a tail gas; and
    (c) all or a portion of the $H_2$ in the first feed stream is obtained by chemical and/or physical separation of $H_2$ from the tail gas.

8. The process of claim 4 wherein the second product stream is produced in a unit that is modular and transportable.

9. The process of claim 1 further comprising:
    producing an oxygenate from the second product stream.

10. The process of claim 9 wherein the oxygenate is selected from the group of methanol, ethanol, dimethyl ether and combinations thereof.

11. The process of claim 9 further comprising:
    producing one or more products selected from the group of olefins, diesel and gasoline from the oxygenate.

12. The process of claim 9 wherein:
    (a) the step of producing the oxygenate occurs in an oxygenate reactor utilizing a Co or Cu-based oxygenate catalyst;
    (b) the oxygenate reactor produces a tail gas; and
    (c) the tail gas is recycled as all or a portion of the first feed stream.

13. The process of claim 12 wherein $1 1_2$ is obtained by chemical and/or physical separation of $H_2$ from the tail gas and added to the first feed stream.

14. The process of claim 1, wherein, in the pre-reforming reactor, the combination of the first feed stream and the second feed stream is conducted using a catalyst comprising an active metal dispersed on a support, where the active metal comprises at least one metal selected from the group consisting of Pt, Rh, Ru, Ni, Co, Pd, Ir and combinations thereof.

15. The process of claim 14, wherein the support is at least one member selected from the group consisting of $TiO_2$, $ZrO_2$, alkaline-earth metal hexaaluminates, monoclinic zirconia and alumina.

16. The process of claim 14, wherein the active metal is at least one member selected from the group consisting of Ir, Pt and Pd; and the support comprises at least one member selected from the group consisting of monoclinic zirconia and an alkaline-earth metal hexaaluminate.

17. The process of claim 14, wherein the active metal is at least one member selected from the group consisting of Ir, Pt and Pd, the support comprises at least one member selected from the group consisting of alumina and an alkaline-earth hexaaluminate, and the catalyst further comprises one or more rare earth oxide promoters.

18. The process of claim 1 wherein the first feed stream comprises more than 10% of the hydrocarbons and/or alcohols having two or more carbon atoms.

19. The process of claim 18 wherein the first feed stream comprises more than 20% of the hydrocarbons and/or alcohols having two or more carbon atoms.

20. The process according to claim 1, wherein the first feed stream has a hydrogen stoichiometric ratio ($\lambda$) in the range of $0.25 \leq \lambda \leq 1.5$.

21. The process according to claim 1, wherein the first feed stream has a hydrogen stoichiometric ratio ($\lambda$) in the range of $0.25 \leq \lambda \leq 1$.

22. The process of claim 1 wherein the syngas generation reactor is selected from the group of steam methane reformers, CO2 dry reformers, autothermal reformers, catalytic partial oxidation reactors and thermal partial oxidation reactors.

23. The process of claim 1 wherein the syngas generation reactor comprises a component selected from the group of ion transport membranes and microchannel reactors.

24. The process of claim 1 wherein the second product stream is produced using air, oxygen-enriched air, or nominally 100% oxygen.

25. The process of claim 1 further comprising:
desulphurizing the first feed stream prior to feeding the first feed stream into the pre-reforming reactor.

26. The process of claim 1 further comprising:
feeding into the syngas generation reactor with the first product stream an additional feed stream comprising one or more members selected from the group consisting of steam, air, non-air oxidants, mixtures of desulphurized gases selected from hydrocarbons, carbon oxides, and inert gases.

27. The process of claim 1, wherein the syngas generation reactor is a, steam methane reformer.

28. The process of claim 1, wherein the catalyst is in a form selected from the group consisting of powders, granulates, tablets, extrudates, and washcoats on ceramic or metallic monoliths, or tubular or plate or corrugated plate structures.

29. The process of claim 1, wherein the first feed stream is introduced into the prereforming reactor prior to the second feed stream being introduced.

30. The process of claim 1, wherein the second feed stream is introduced into the prereforming reactor prior to the first feed stream being introduced.

31. The process of claim 1, wherein the first feed stream and second feed stream are introduced into the pre-reforming reactor simultaneously.

32. The process of claim 1, wherein the first feed stream and second feed stream are combined prior to introduction into the pre-reforming reactor.

33. The process of claim 1 wherein the process is utilized at a production location utilizing a mobile catalyst activation and/or regeneration process.

34. The process of claim 1 wherein the syngas generation unit is modular and transportable.

35. A process comprising:
combining a first feed stream and a second feed stream to produce, in a prereforming reactor, a first product stream comprising $CH_4$ and $H_2O$, wherein:
the first feed stream comprises a mixture of $H_2$ and at least one component selected from the group consisting of hydrocarbons having two or more carbon atoms and alcohols having two or more carbon atoms, wherein more than 20% of the first feed stream comprises said hydrocarbons and/or alcohols having two or more carbon atoms and the amount of hydrogen is such that the first feed stream has a hydrogen stoichiometric ratio ($\lambda$) in the range of $0.25 \leq \lambda 1$; and
the second feed stream comprises steam, wherein the molar ratio of steam to carbon atom contained in the combined first and second feed stream, S:C, is in a range from 3:1 to 4:1;
feeding the first product stream into a syngas generation reactor; and
reacting the first product stream in the syngas generation reactor to produce a second product stream comprising synthesis gas,
separating $H_2$ from the second product stream and using the separated $H_2$ to provide at least some of the $H_2$ in the first feed stream.

* * * * *